United States Patent [19]

Weiche

[11] 4,308,318

[45] Dec. 29, 1981

[54] RUB RESISTANT RIBBON FOR NON-IMPACT PRINTING

[75] Inventor: William J. Weiche, Los Gatos, Calif.

[73] Assignee: International Business Machines Corporation, Armonk, N.Y.

[21] Appl. No.: 200,370

[22] Filed: Oct. 24, 1980

Related U.S. Application Data

[63] Continuation-in-part of Ser. No. 59,918, Jul. 20, 1979, abandoned, which is a continuation-in-part of Ser. No. 860,663, Dec. 15, 1977, abandoned.

[51] Int. Cl.³ .............................................. B32B 27/36

[52] U.S. Cl. .................................... 428/412; 101/469; 101/473; 400/119; 400/120; 400/241.1; 427/58; 427/144; 428/474.4; 428/914

[58] Field of Search ................ 427/58, 108, 146, 144; 428/474.4, 395, 914, 412; 400/119, 120, 237, 241, 241.1, 241.2; 101/473, 469, 472

[56] References Cited

U.S. PATENT DOCUMENTS

| | | | |
|---|---|---|---|
| 2,713,822 | 7/1955 | Newman | 427/144 |
| 3,037,879 | 6/1962 | Newman et al. | 400/241.1 |
| 3,201,275 | 8/1965 | Herrick | 427/108 |
| 3,392,042 | 7/1968 | Findlay et al. | 400/201.2 |
| 3,413,184 | 11/1968 | Findlay et al. | 428/914 |
| 3,493,427 | 2/1970 | Takagi et al. | 400/119 |
| 3,682,683 | 8/1972 | Elbert et al. | 428/914 |
| 3,744,611 | 7/1973 | Montanni et al. | 400/120 |
| 4,092,280 | 5/1978 | Barouh et al. | 428/914 |
| 4,206,937 | 6/1980 | Huston | 427/144 |

OTHER PUBLICATIONS

IBM Technical Disclosure Bulletin, vol. 22, No. 2, Jul. 1979, Crooks et al., "Resistive Ribbon Ink Layers".

*Primary Examiner*—S. L. Childs
*Attorney, Agent, or Firm*—Joseph G. Walsh

[57] ABSTRACT

A ribbon for non-impact printing comprising an electrically conductive substrate and a transfer layer which comprises a polymerized fatty acid polyamide.

3 Claims, No Drawings

RUB RESISTANT RIBBON FOR NON-IMPACT PRINTING

CROSS REFERENCES TO RELATED APPLICATIONS

The present application is a Continuation-in-Part of copending application Ser. No. 59,918 filed July 20, 1979, which is a continuation-in-part of application Ser. No. 860,663, filed Dec. 15, 1977 both now abandoned.

DESCRIPTION

Technical Field

The present invention is concerned with a ribbon for use in non-impact printing. In particular, it is concerned with the transfer coating for such a ribbon. Printing is achieved by transferring the transfer coating from a ribbon to paper by means of local heating of the ribbon. Such localized heating may be obtained, for example, by contacting the ribbon with point electrodes and a broad area contact electrode. The high current densities in the neighborhood of the point electrodes during an applied voltage pulse produce intense local heating which causes transfer of transfer coating from the ribbon to a paper in contact with the ribbon.

Background Art

U.S. Pat. Nos. 2,713,822 and 3,744,611 both describe non-impact printing processes employing a ribbon containing a transfer coating and a substrate. In the prior art the transfer coating has been a mixture of carbon, dye and waxes which melt at from about 85° to about 90° C. Such transfer coatings have poor rub resistance. It is an object of the present invention to provide a transfer coating for non-impact printing which is rub resistant.

SUMMARY OF THE INVENTION

A ribbon formulation for use in non-impact printing has been provided. The formulation is rub resistant and offers high resolution, dense printing. The transfer coating comprises coloring material, for example, carbon black, one or more dyes, or both, and a polymerized fatty acid polyamide.

Outstandingly good results have been obtained using the polyamides of the present invention. Examples of such polyamides are Versamid polyamides produced by General Mills, Inc. Versamid polyamides are polymerized fatty acid polyamides. These materials are well known to the art and are discussed, for example, in the "Handbook of Common Polymers" by Roff et al (1971) C.C.R. Press, Cleveland, Ohio, beginning at page 209.

The polyamides of the present invention have the additional advantage that they may be applied with a solvent which does not harm the substrate of the ribbon. The polyamide transfer layers of the present invention can be used with any of the prior art conductive substrates used in resistive ribbon printing. The preferred substrate is a polycarbonate resin containing conductive carbon particles. As examples of solvents which do not attack the substrate, and in which the polyamide is soluble, there may be mentioned alcohols, particularly n-propanol or isopropanol, and also mixtures of one or more alcohol with water. Toluene is also a useful solvent. By the use of such solvents, the polyamide transfer media may be applied directly to the ribbon substrate during the manufacturing process.

It is necessary that the transfer coating contain a coloring material. Carbon black is generally preferred.

When desired, in addition to the carbon black, one or more dyes may also be incorporated. In general, about 30% by weight of carbon black and about 3% by weight of dye will be incorporated in the transfer coating.

The ribbons obtained according to the present invention have excellent handling characteristics. No transfer occurs from the ribbon to the hands. When used in non-impact printing, the coating transfers at energies equal to or less than that required for wax-based inks. Furthermore, transfer does not occur upon impact.

The particular most desirable feature of printing does by a non-impact process using a ribbon of the present invention containing a suitable polyamide resin is that the printing is both dry and wet rub resistant and offers high resolution and excellent appearance. The quality of the printing is extremely high. Even under a 100 power microscope, no flaws can be seen.

The following examples are given solely for purposes of illustration and are not to be considered limitations on the invention, many variations of which are possible without departing from the spirit or scope thereof.

EXAMPLE 1

19.2 gms of a polymerized fatty acid polyamide (General Mills Versamid 950) was dissolved in 89 gms of propyl alcohol. Added to the solution was 2.84 gms of carbon (Degussa Special Black 4) and 0.25 gms of Methyl Violet dye. The mixture was then dispersed by vigorous stirring for 45 minutes.

The dispersion was then cast onto a substrate of 70% polycarbonate and 30% conductive carbon, said substrate having a sheet resistivity of approximately 400 ohms/sq. The thermoplastic polymeric resin transfer coating was then dried to remove excess solvent. Dry thickness of the ink layer was 5 microns.

The ribbon was mounted on a print robot with the ink surface against the paper. A print head consisting of two mil tungsten electrodes was engaged against the backside of the ribbon. The printer was operated at a speed of 10 inches/sec. and power of 35 volts, 80 milliamps, and at a pulse duration of one millisecond. On removal from the robot a dense black, high resolution print on paper was observed. The print was resistant to mechanical abrasion, both wet and dry. Under a 100 power microscope, no flaws could be seen.

EXAMPLE 2

The same ribbon configuration as described in Example 1 was placed on the robot and operated at 10 inches/sec. without the use of electrical current. On removal no print was observed. This experiment showed the ribbon to be impact resistant, and also showed that print could be obtained only through the use of current causing the polyamide resin transfer coating to melt and adhere to paper or another image receiver.

EXAMPLE 3

A transfer coating was prepared in the same manner as Example 1. The dispersion was then cast onto a substrate such as described in Example 1 except that an intermediate layer of 1000 Å of evaporated aluminum had been deposited on the substrate, offering a highly conductive ground plane.

The ribbon was then mounted on the robot and printed at a speed of 10 inches/sec. With this configuration, print energies of 13 volts and 60 milliamps were sufficient to obtain a black, rub resistant print on paper.

EXAMPLE 4

A transfer coating was prepared in the same manner as Example 1 except the carbon was replaced with a color pigment, Litho Red. The transfer coating was coated onto a substrate described in Example 1. When printed on the robot, a red, rub resistant print was observed.

EXAMPLE 5

A ribbon was prepared in the same manner described in Example 1 except the carbon was replaced with a colored pigment known as Victoria Blue. When printed, a blue rub resistant image was observed.

EXAMPLE 6

A ribbon was prepared in the same manner described in Example 1 except the carbon was replaced with a colored pigment known as Elgin Green. When printed, a green rub resistant image was observed.

EXAMPLE 7

As a control, to show the benefits and advantages obtained when the polyamide is a polymerized fatty acid, an experiment was run in which a different type of polyamide was used. The polyamide was a terpolyamide from caprolactam and nylon salts. It is available commercially from Belding Chemical Industries as Nylon 616.

When Nylon 616 is used as in Example 1, in place of the Versamid 950, a legible print is obtained. The print quality, however, is inferior. The print density is much lower. Discontinuity in the print character may be seen with the naked eye.

EXAMPLE 8

As an additional control, Elvanide 8063 from DuPont was used as in Example 1, in place of Versamid 950. Elvanide 8063 is still a different type of polyamide. Once again, the print quality was inferior. Discontinuity in the print could be seen with the naked eye.

I claim:

1. A ribbon for non-impact printing comprising an electrically conductive substrate and a transfer layer which comprises coloring material and a polymerized fatty acid polyamide.

2. A ribbon as claimed in claim 1 wherein the electrically conductive substrate is a polycarbonate resin containing electrically conductive particles of carbon black.

3. A ribbon as claimed in claim 1 wherein the transfer layer is applied to the substrate by dissolving the transfer layer in a solvent and applying it as a coating.

* * * * *